Sept. 30, 1958      E. T. ABLE ET AL      2,854,251

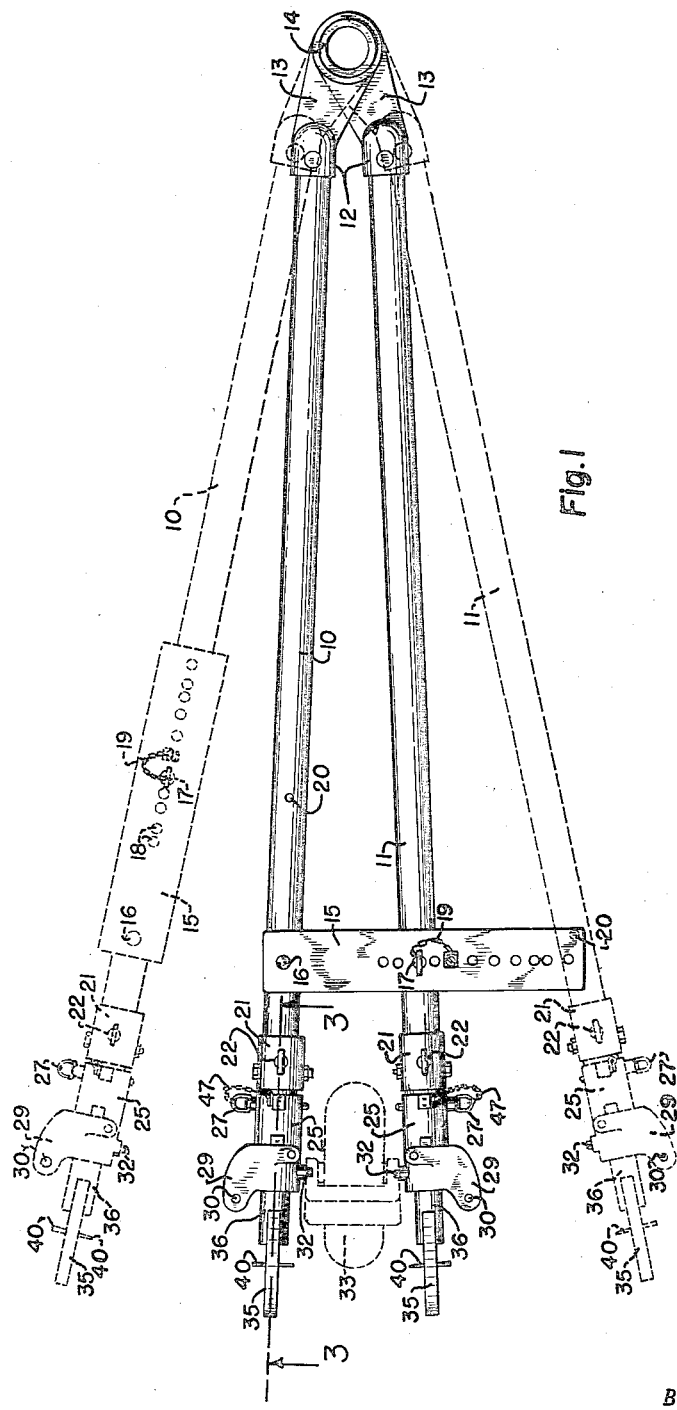

TOW BARS FOR AIRCRAFT

Filed Jan. 16, 1956      2 Sheets-Sheet 2

INVENTORS
Edward T. Able
BY John DeRuiter

ATTORNEY

United States Patent Office 2,854,251
Patented Sept. 30, 1958

2,854,251

TOW BARS FOR AIRCRAFT

Edward T. Able and John De Ruiter, Denver, Colo., assignors to B. K. Sweeney Mfg. Co., Denver, Colo.

Application January 16, 1956, Serial No. 559,363

1 Claim. (Cl. 280—415)

This invention relates to a tow bar for aircraft. Due to the wide variety of different types of aircraft the towing thereof at air ports and air fields presents a difficult problem. A tow bar which is designed specifically for a particular aircraft cannot be conveniently used for towing a different type of craft, due to the differing provisions provided on aircraft for receiving tow bars.

The principal object of this invention is to provide a universal tow bar which can be quickly and easily adjusted and adapted for application to various types of aircraft.

Certain types of aircraft provide widely spaced rings for the reception of towing hooks. Other types are provided with pins projecting from opposite sides of the tail wheel fork for receiving a tow bar. Other types are provided with hollow axles for the tail and nose wheels into which the tow bar must be attached. This invention is designed to provide, in a single, unitary device, attachment means which can be quickly adjusted for attaching the improved tow bar to the towing rings, the tail and nose wheel sockets and studs, or the other openings and protuberances provided on conventional aircraft so that the tow bar may be quickly, easily and safely attached to any conventional aircraft.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of the improved aircraft tow bar, illustrating, in solid line, the position of the tow bar when adjusted to engage towing sockets in the tail wheel shaft of an airplane and in broken line the position of the tow bar when adjusted to engage towing rings on the landing gear of a conventional plane;

Fig. 2 is a side view of the improved tow bar;

Figure 3:
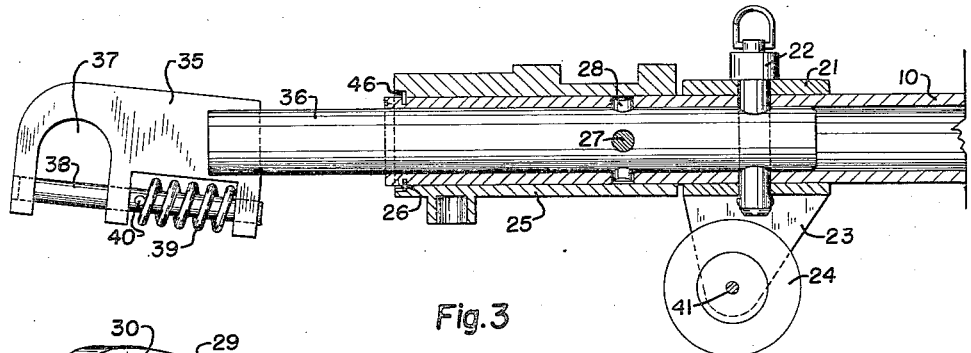
Fig. 3 is an enlarged, fragmentary, longitudinal section, taken on the line 3—3, Fig. 2.

The improved aircraft tow bar consists of two tubular arms 10 and 11 preferably formed from aluminum tubing. The forward extremities of the arms 10 and 11 are locked into arm sockets 12 formed on the extremities of two overlapping hinge plates 13 which are hingedly secured together by means of a suitable gimbal ring 14 adapted to be mounted in the tow hitch of any desired towing vehicle.

The two arms 10 and 11 may be adjustably locked in a plurality of relatively-close spaced-positions by means of a spacer bar 15 which is pivoted upon the arm 10 by means of a suitable pivot bolt or rivet 16 and which is adapted to be secured to the other arm 11 through the medium of a removable spacing pin 17. The spacer bar 15 is provided with a plurality of pin openings 18 for receiving the pin 17, and each pin opening is properly positioned to provide the required spacing between the arms 10 and 11 to accommodate a particular type of aircraft towing hitch. The pin 17 is preferably attached to the bar 15 through the medium of a suitable chain 19 to prevent loss of the pin.

When the tow bar is being used on aircraft requiring a wide separation of the arms 10 and 11, such as on planes provided with tow bar rings, the spacer bar 15 is swung over the arm 10, as shown in broken line in Fig. 1, and secured thereon by passing the pin 17 through the bar 15 and into a retaining opening 20 in the arm 10.

A wheel collar 21 is slidably fitted over each of the arms 10 and 11 adjacent the rear extremity thereof and is secured thereon by means of a suitable wheel pin 22. The collars 21 are each provided with a pair of downwardly projecting, parallel wheel brackets 23, and a pneumatic-tired wheel 24 is rotatably mounted on a wheel axle 41 extending between the brackets of each pair of wheel brackets 23. A tubular attachment sleeve 25 is rotatably mounted on the rear extremity of each of the arms 10 and 11 and is retained thereon by means of a snap ring 26 which is indented into the arm and positioned in a terminal annular socket 46 in the sleeve 25. The sleeves 25 are locked against rotation at 90° intervals by means of locking pins 27 arranged to extend through diametrically positioned, receiving openings 42 in the sleeve and through vertically aligned and horizontally aligned receiving openings 28 in the arms.

Figure 4:
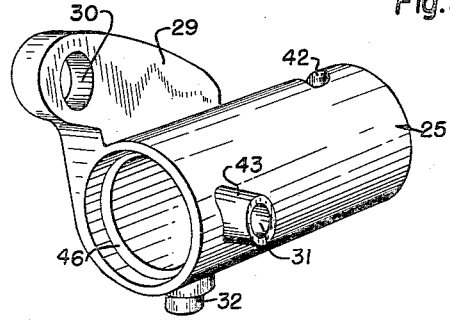
Fig. 4 is a detail perspective of one side of a rotary attachment sleeve employed on the improved tow bar.
Figure 5:
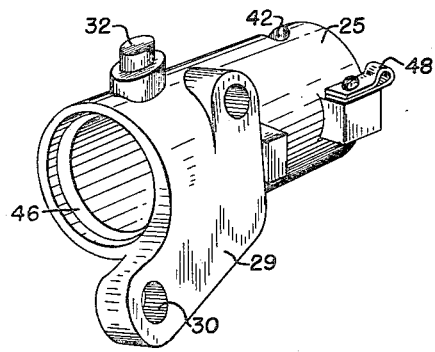
Fig. 5 is a similar perspective view of the opposite side of the attachment sleeve of Fig. 4.

Each sleeve 25 is provided with a bracket ear 29 having a relatively large stud-receiving opening 30, with a hollow boss 43 provided with a stud-receiving socket 31, and with a shouldered projecting stud 32, as illustrated in Figs. 4 and 5. The stud 32, the socket 31 and the bracket ear 29 of each sleeve 25 are positioned at 90° intervals from each other so that the latter elements of each sleeve may be brought into alignment with the elements of the other sleeve by withdrawing the locking pins 27 and rotating the sleeves 25 through 90° intervals and reinserting the pins.

Let us assume that the tow bar is to be attached to an aircraft of the type having a tubular tail wheel axle, such as indicated in broken line at 33 in Fig. 1. The locking pins 27 are removed and the sleeves 25 are rotated until the stud 32 of each sleeve aligns with the stud 32 of the opposite sleeve. The two studs are now inserted in the extremities of the tubular axle, the two arms 10 and 11 are drawn together, and the spacer pin 17 is inserted through the pin opening 18 which is directly over the pin hole in the arm 11. The tow bar is now securely locked in place and the craft can be safely towed from any suitable towing vehicle.

Now let us assume it is desired to tow an aircraft of the type having projecting studs on the tail wheel structure. The locking pins 27 are removed, the sleeves 25 are rotated to face the two sockets 31 toward each other, and the pins 27 are reinserted. The two sockets are now brought over the aircraft landing wheel studs and the arms 10 and 11 are locked in the proper spaced position by means of the spacing pin 17.

Let us assume it is desired to tow an aircraft of the type having relatively large projecting lugs extending from each side of the tail wheel shock absorber mechanism, such as used on certain well known planes. The sleeves 25 are rotated, as previously described, to bring the two bracket ears 29 into vertical position facing each other and the locking pins are inserted. The stud receiving openings 30 are passed over the landing gear studs, and the spacer bar 15 is again locked by means of the spacer pin 17 to maintain the two ears 29 on their respective studs.

Figure 6:
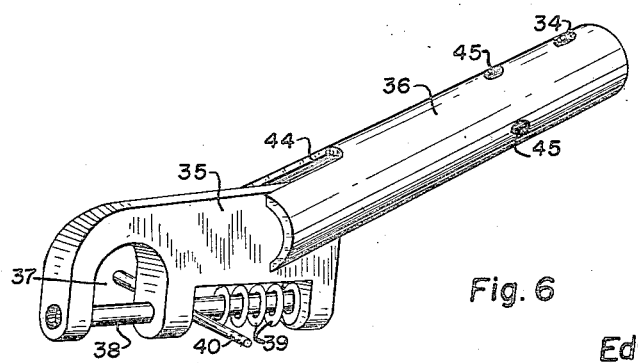
Fig. 6 is a similar perspective view illustrating a towing ring hook device employed with the improved tow bar.

For attaching the improved tow bar to an aircraft of the type having tow bar rings, an attachment hook member 35, as illustrated in Fig. 6, is provided for each of the arms 10 and 11. Each attachment hook member 35 is welded or otherwise secured in a notch 44 in the extremity of a tubular shank 36 adapted to be inserted into the tubular extremity of one of the arms 10 or 11. The shank 36 is provided with two diametrically aligned openings 34 through which the wheel pin 22 of the wheel collar 21 passes to fixedly lock the shank in place in the arm. The shank 36 is also provided with openings 45 for the passage of the locking pin 27. The hook member 35 is formed with a receiving notch 37 across which a latch bar 38 is constantly urged by means of a compression spring 39. The spring 39 acts against a cross pin 40 extending through the latch bar 38 and which acts as a handle for withdrawing the latch bar from the notch 37.

To attach the tow bar to planes having widely spaced tow bar rings, the spacer bar 15 is swung to the inactive position over the arm 10 and locked thereon by means of the spacer pin 17 and the two arms are spread apart, as shown in broken line in Fig. 1. The hook members 35 are then hooked over the tow bar rings by withdrawing the latch bars 38 and are locked in place thereon by releasing the latch bars to the action of the springs 39. The aircraft can now be safely towed forwardly by the towing vehicle.

The wheels 24 provide convenient support for the rear of the tow bar when not in use. Should the wheels interfere with attachment of the tow bar, the wheel pins may be withdrawn and the collars 21 rotated to place the wheels on the top or the entire tow bar may be inverted.

Thus, it can be seen that the improved landing gear can be adapted to a wide variety of differing aircraft by simple rotation of the sleeves 25 without it being necessary to remove or replace any attachments or appliances.

It is preferred to attach the locking pins 27 to retaining chains 47 which are attached to chain clips 48 on the sleeves 25 to prevent loss of the pins.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

An aircraft tow bar comprising a pair of elongated tubular arms having the adjacent ends thereof hingedly connected for relative angular movement, an elongated tubular shank having the major portion thereof disposed within the free end portion of each arm, with a minor portion thereof projecting beyond the end of the respective arm, an elongated sleeve surrounding each arm adjacent the free end thereof, cooperating means on each arm and respective sleeve providing for the rotation of the sleeve around the arm and restricting the axial movement thereof, means securing said shank against rotation within the arm, each of said shanks being provided with a plurality of apertures disposed on transverse axes in right angular relation to each other, each of said arms being provided with apertures corresponding to those in the shank, each of said sleeves being also provided with apertures for selective alignment with the apertures in said shank, a pin receivable in pairs of aligned apertures for disposing the sleeve at 90° spaced positions around the respective arm, aircraft engaging means on said sleeve in angularly related positions circumferentially thereof, and aircraft engaging means carried by said shank.

References Cited in the file of this patent

UNITED STATES PATENTS

| | | |
|---|---|---|
| 1,535,397 | Buffington | Apr. 28, 1925 |
| 2,287,955 | Zunino | June 30, 1942 |
| 2,295,021 | Weiss | Sept. 8, 1942 |
| 2,340,273 | Phillips | Jan. 25, 1944 |
| 2,391,608 | Wood | Dec. 25, 1945 |
| 2,692,149 | Wilcox | Oct. 19, 1954 |

FOREIGN PATENTS

| | | |
|---|---|---|
| 463,395 | Germany | July 27, 1928 |